(12) United States Patent
Baweja et al.

(10) Patent No.: US 6,868,298 B2
(45) Date of Patent: Mar. 15, 2005

(54) METHOD AND APPARATUS FOR BOTTLENECK FEED FACTOR BASED SCHEDULING

(75) Inventors: Gurshaman Baweja, Allen, TX (US); Hoa La, Lewisville, TX (US)

(73) Assignee: Texas Instruments Incorporated, Dallas, TX (US)

( * ) Notice: Subject to any disclaimer, the term of this patent is extended or adjusted under 35 U.S.C. 154(b) by 86 days.

(21) Appl. No.: 10/301,201

(22) Filed: Nov. 21, 2002

(65) Prior Publication Data
US 2003/0130756 A1 Jul. 10, 2003

Related U.S. Application Data
(60) Provisional application No. 60/344,204, filed on Dec. 28, 2001.

(51) Int. Cl.[7] ............................................. G06F 19/00
(52) U.S. Cl. ............................ 700/100; 700/95; 700/99
(58) Field of Search ................................. 705/8; 700/90, 700/95, 99, 100, 103, 121

(56) References Cited

U.S. PATENT DOCUMENTS

| | | | | |
|---|---|---|---|---|
| 5,706,200 | A | * | 1/1998 | Kumar et al. ............... 700/100 |
| 5,748,478 | A | * | 5/1998 | Pan et al. ..................... 700/99 |
| 6,243,612 | B1 | * | 6/2001 | Rippenhagen et al. ...... 700/100 |

* cited by examiner

Primary Examiner—Jayprakash N. Gandhi
(74) Attorney, Agent, or Firm—W. Daniel Swayze, Jr.; W. James Brady; Frederick J. Telecky, Jr.

(57) ABSTRACT

A method and system for scheduling lots for semiconductor manufacturing. The method and system comprising: determining a goal weighing factor (502); calculating the bottleneck feed factor for each lot in a tool queue (514); calculating the critical ratio for said each lot in a tool queue (516); calculating the relative rank of each lot in a tool queue; displaying the relative rank of each lot in a tool queue, for each tool queue; and selecting the lots in each tool queue for tooling according to said relative rank.

26 Claims, 3 Drawing Sheets

METHOD AND APPARATUS FOR BOTTLENECK FEED FACTOR BASED SCHEDULING

CROSS-REFERENCE TO OTHER APPLICATIONS

This application claims priority from provisional application No. 60/344,204, filed on Dec. 28, 2001 and which is hereby incorporated by reference.

TECHNICAL FIELD OF THE INVENTION

The present invention relates generally to manufacturing processes such as those utilized in a semiconductor manufacturing environment and, more specifically, to apparatuses and methods for controlling the fabrication progress of semiconductor devices, including the production of lots through a manufacturing line.

BACKGROUND OF THE INVENTION

Manufacturers, such as but not limited to semiconductor manufacturers, continually strive to satisfy customer demands such as on-time delivery and lowest possible cost. Given the capital-intensive nature of the semiconductor industry, for instance, ever increasing capacity cost and longer lead-times, the manufacturing philosophy is to maximize output from its facilities while maintaining the minimum amount of Work-In-Progress ("WIP"). The scheduling of lots to fulfill the above goals is a real challenge in today's manufacturing environment of short product life cycles, complex product mix and shrinking time to market.

Various general rules have been used to address scheduling problems. These approaches usually select the lot to be processed based on computed parameters of lots, operations and/or manufacturing entities. Some of the commonly used computed parameters deal with processing times, due dates, setup times, and arrival times. Examples of several rules based on these parameters are FIFO (first-in, first-out), LIFO (last-in, first out), LPR (longest processing time remaining), SPT (shortest processing time first), LPT (longest processing time first), and EDD (earliest due date).

However, such rules do not take into account the continuously changing dynamics of the manufacturing line. Due to complex product mix, the line dynamics may change with time, thus changing the priority for the individual lots. Some known systems for scheduling lots fail to account for the current line dynamics in a manufacturing line. Another disadvantage is that many of the known methods of scheduling lots optimize the output of individual tools on the manufacturing line, thereby leading to optimized local WIP movement. This may lead to adversely affecting the overall performance of the factory due to conflicts created by local optimization. Other known methods only allow for optimizing factory efficiency at the expense of timely customer delivery, or timely customer delivery may be optimized at the expense of factory efficiency. Still other known methods of scheduling lots only allow optimization to be performed over a relatively long time span such as, for example, every 2–4 hours.

Based on the foregoing, it may be appreciated that a means of overcoming the disadvantages associated with prior art lot scheduling and processing systems would be advantageous.

SUMMARY OF THE INVENTION

The disclosed invention is a system for scheduling lots of items for manufacturing comprising: a manufacturing line, with a plurality of stations where a plurality of lots are processed for manufacturing; a tool at each station for processing the plurality of lots; and a lot scheduling processor communicably coupled to the stations and able to compute bottleneck feed factors and critical ratios for each lot based on time needed at bottleneck minus buffer time, planned cycle time for each lot, estimated time until end of the line for each lot, and time until due for each lot.

The disclosed invention is also a method for scheduling the processing of lots for manufacturing in a manufacturing line, where the manufacturing line has a plurality of stations, and tools at the stations for processing lots of items to be manufactured with a lot scheduling processor communicably coupled to the stations. The method comprises the steps of: providing, to the lot scheduling processor, the time needed at bottleneck minus buffer time; providing, to the lot scheduling processor, the planned cycle time to bottleneck for each lot; providing, to the lot scheduling processor, the estimated time until the end of the line for each lot; providing, to the lot scheduling processor, the time until due for each lot; calculating, by the lot scheduling processor, the bottleneck feed factor for each lot; calculating, by the lot scheduling processor, the critical ratio for each lot; calculating, by the lot scheduling processor, a ranking of lots based upon the bottleneck feed factors and critical ratios; and processing the lots in order according to the ranking.

Also disclosed is a method for scheduling lots for semiconductor manufacturing, comprising the steps of: determining a goal weighing factor; calculating the bottleneck feed factor for each lot in a tool queue; calculating the critical ratio for said each lot in a tool queue; calculating the relative rank of each lot in a tool queue; displaying the relative rank of each lot in a tool queue, for each tool queue; and selecting the lots in each tool queue for tooling according to said relative rank.

Further disclosed is a method for scheduling lots for semiconductor manufacturing comprising the steps of: determining a goal weighing factor; obtaining the time needed at bottleneck minus buffer; obtaining the planned cycle time for each lot; obtaining the estimated time until the end of the line for each lot; obtaining the time until due for each lot; calculating the bottleneck feed factor for each lot in a tool queue; calculating the critical ratio for each lot in a tool queue; calculating the relative rank of each lot in a tool queue; and selecting the lots in each tool queue for tooling according to the relative rank.

An advantage of the invention is that the bottleneck feed factor based scheduling algorithm has been designed to minimize the idle time of bottlenecks across the line.

Another advantage of the invention is that the critical ratio may be incorporated into an overall ranking of lots, thereby striking a balance between manufacturing efficiency and customer delivery.

Still another advantage is that the scheduling system may be continually updated (approximately every 5 minutes or less) thereby maximizing bottleneck throughput as well as promoting manufacturing line linearity.

Still another advantage is that the lots may be prioritized by customer due date.

Still another advantage is that an appropriate trade-off between increasing the efficiency of the manufacturing on the one hand and providing manufactured items by the customer due date on the other may be made.

Still another advantage is that the whole manufacturing facility may be optimized as opposed to only optimizing the output of individual tools.

Still another advantage of the invention is that upstream WIP may be prioritized as opposed to only local optimization at the bottleneck.

Still another advantage is that the invention allows for the optimization of manufacturing processes with moving bottlenecks. Specifically, pull points may be specified where lots may be removed from a particular tool for a certain amount of time, for example for a scheduled tool outage or for maintenance of a tool.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings.

FIG. 1 is an illustration of a manufacturing line with a plurality of lots, tools and bottlenecks;

FIG. 2 illustrates a manufacturing line with a plurality of lots, tools and bottlenecks, wherein the lots are ranked according to the invention;

FIG. 3a illustrates a manufacturing line comprising a plurality of lots, tools, bottlenecks, displays and a lot scheduling processor;

DETAILED DESCRIPTION OF THE PREFERRED EMBODIMENTS

Figures 1, 2, 3A:
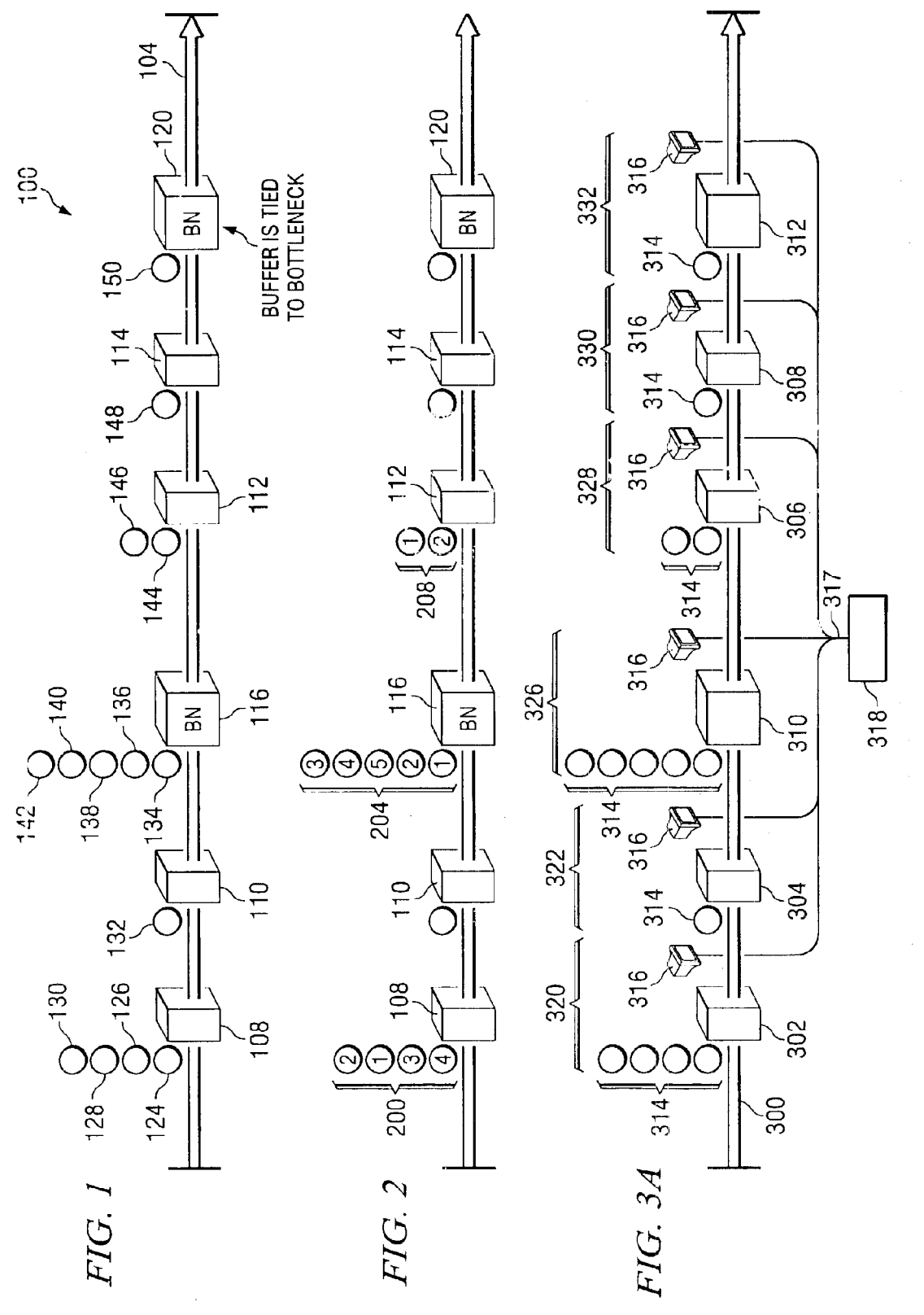
Figure 3B:
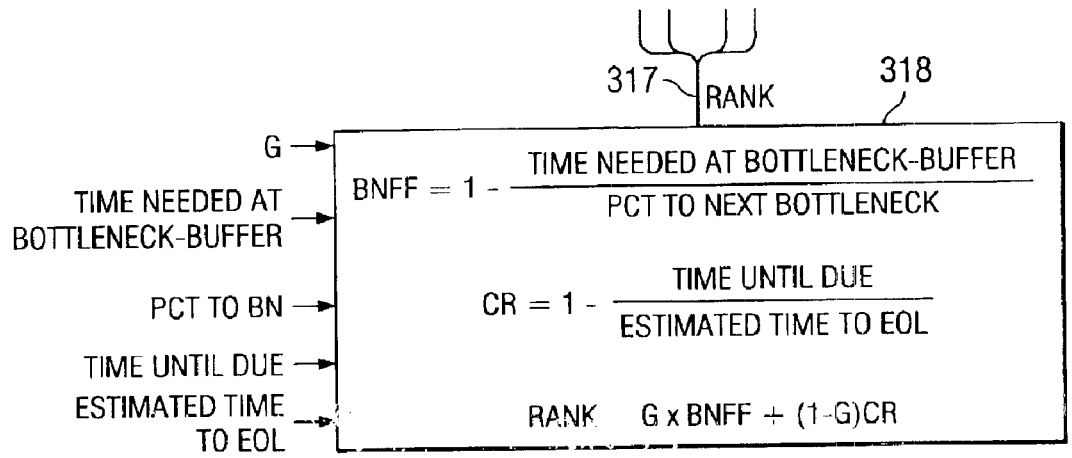
FIG. 3b illustrates the components of a lot scheduling processor according to the invention.

With reference now to the figures and in particular with reference to FIG. 1, therein is depicted system 100 for scheduling lots of items to be manufactured in accordance with one embodiment of the present invention. A manufacturing line 104 moving from left to right is shown. Tools and machines used in the manufacturing process are represented by small rectangular boxes 108, 110, 112 and 114. Tools and machines which are known for bottlenecks and are therefore referred to as "bottlenecks" are represented by larger boxes 116 and 120. The plurality of lots being manufactured are represented by circles 124–150.

Each lot 124–150 on the manufacturing line 104 has certain properties associated with it. One property is the planned cycle time ("PCT"). The PCT is the amount of time for a particular lot 124–150 to move through the next tool, the PCT includes the time required to machine the lot at the next tool, the processing time, the time to transport the lot, and any waiting time. The "PCT to next bottleneck" is another important property of each lot 124–150 and is the amount of time for a particular lot 124–150 to move to the next bottleneck, this time does not include the time to machine the lot 124–150 at the next bottleneck. The PCT to next bottleneck may be determined by adding the PCT for all tools in between the current location of the lot to the next bottleneck. Thus the PCT to next bottleneck for lot 124 in FIG. 1 would be the time necessary for it to be tooled at tool 108 (the PCT of lot 124 with respect to tool 108) plus the time necessary for it to be tooled at tool 110 (the PCT of lot 124 with respect to tool 110). This gives to the PCT to next bottleneck for lot 124, one should note that the PCT to the next bottleneck does not include the tooling time at the bottleneck (the PCT of lot 124 with respect to bottleneck 116).

Another property associated with each lot on the manufacturing line is the time needed at bottleneck. A particular lot's time needed at bottleneck is the cycle time ("CT") of all lots ahead of the particular lot to be tooled through the bottleneck minus the buffer required at the bottleneck. The buffer required at bottleneck, which may be referred to as simply "buffer", is a certain amount of work purposefully kept at the bottleneck in order to reduce the likelihood of the bottleneck running out of lots to process. The time needed at bottleneck informs the system when the bottleneck tool will be ready for the particular lot. For instance if a particular lot 124 has a time needed at bottleneck of 4 hours, that means that if lot 124 is not ready to be tooled at the bottleneck 116 in 4 hours, the bottleneck 116 will be idle. An idle bottleneck contributes to inefficiencies in the manufacturing line.

The following is an example of how to determine the time needed at bottleneck of a particular lot. Assuming that when there are a plurality of lots in a queue at a tool or bottleneck, the lot at the top of the queue would be tooled first (e.g. lot 130 would be tooled first at tool 108, lot 128 would be tooled second at tool 108, lot 126 would be tooled third at tool 108, and finally lot 124 would be tooled fourth at tool 108). Thus, the time needed at bottleneck 116 for lot 124 would estimated by the following: the CT of lot 142 through bottleneck 116+CT of lot 140 through bottleneck 116+CT of lot 138 through bottleneck 116+CT of lot 136 through bottleneck 116+CT of lot 134 through bottleneck 116+CT of lot 132 through bottleneck 116+CT of lot 130 through bottleneck 116+CT of lot 142 through bottleneck 128+CT of lot 142 through bottleneck 126—buffer. Similarly the time needed at bottleneck 120 for lot 144 would be determined by the following: CT of lot 150 through bottleneck 120+CT of lot 148 through bottleneck 120+CT of lot 146 through bottleneck 120–buffer. Those skilled in the art will appreciate that the lots may be tooled in various orders, not necessarily from top to bottom.

The PCT to next bottleneck and time needed at bottleneck allow for the determination of a ratio for each lot in the manufacturing line. This ratio may be called the bottleneck Feed Factor (BNFF) and is given by the expression of equation 1.

$$BNFF = 1 - \frac{\text{Time Needed at Bottleneck} - \text{Buffer}}{PCT \text{ to next Bottleneck}} \qquad \text{eq. 1}$$

Thus, if the PCT for lot 124 is 5 hours and the time needed at bottleneck 116 for lot 124 is 2 hours, and the buffer is 1 hour, then the BNFF for lot 124 is given by 1−(2−1)/5=0.8. Similarly, if the PCT for lot 144 is 4 hours and the time needed at bottleneck 120 is 2 hours and the buffer is ½ hour, then the BNFF for lot 144 is given by 1−(2−0.5)/4=0.625.

Another property associated with each lot is the estimated time to the End Of the manufacturing Line ("EOL"). This is the current time estimated to finish tooling the particular lot and move to the end and out of the manufacturing line. Another property associated with each lot is the time until due, which is the original expected time to the EOL, also known as the customer due time. Thus for example, if a customer was told that lot 124 would be finished two days from particular date, then the time until due may be 2 days from the particular date. However, the estimated time to EOL for lot 124 may be 4 days from the particular date. The estimated time to EOL and time until due for each lot may be express in a ratio called a Critical Ratio ("CR") and be given by equation 2.

$$CR = 1 - \frac{\text{Time Until Due}}{\text{Estimated Time to EOL}} \qquad \text{eq. 2}$$

Thus, for lot 144, if the estimated time to EOL is 4 days, and the time until due is 2 days, then CR is given by 1−(2/4)=0.5. Those skilled in the art will recognize that various units of time may be used for Time Until Due and Estimated Time to EOL.

There are two competing goals in a manufacturing environment, 1) one is to operate the manufacturing facility in as efficient manner as possible, e.g. keep the bottlenecks from starving, 2) another is to provide to the customer his or her products as close to the promised date (or earlier) as possible. These two goals are often conflicting goals, and a plant manager may need to determine which of the two goals he or she must weigh more favorably and by how much to weigh one goal more favorably than other, if at all. One disclosed method of assigning weight to these two goals is to rank each lot by both the BNFF and CR and include a goal weighing factor ("G"). Such a method would be governed by the expression of equation 3.

$$\text{RANK} = G \times \text{Bottleneck Feed Factor} + (1-G) \times \text{Critical Ratio} \qquad \text{eq. 3}$$

In equation 3, G is number between 1 and 0 assigned by someone such as plant manager or production coordinator. (1−G) is of course the complement of G, thus if G is set to 0.2 (a relatively low weight factor applied to plant efficiency), then (1−G) would be 0.8 (a relatively high weight factor applied to customer due date. Thus, by using eq. 3 for each lot 124–130, 134–142, 144–146 in a queue on a manufacturing line 104, one would obtain a ranking of each lot 124–130, 134–142, 144–146 and one would use said ranking to determine the order of manufacturing the lots 124–130, 134–142, 144–146 from a queue, wherein the lot with the largest value for its RANK would be the first to be manufactured out of its queue and the lot with the smallest value for its RANK would be the last lot to manufactured out of its queue.

With reference now to FIG. 2, therein is depicted a manufacturing system in accordance with one embodiment of the present invention. A manufacturing line moving from left to right is shown. Tools and machines 108, 110, 112 and 114 used in the manufacturing process are represented by small rectangular boxes. Bottlenecks 116 and 120 are represented by larger boxes. The plurality of lots 200, 204 and 208 being manufactured are now shown with hypothetical rankings in their respective queues after being hypothetically ranked by applying eq. 3 to each lot. For instance, in the first queue of lots 200, the lots are ranked with respect to each other as follows: top lot is ranked $2^{nd}$, the next lot is ranked $1^{st}$, the next lot is ranked third and the next lot is ranked 4th. Similarly lots 204 and 208 are shown with each lot in the queue ranked relative to other lots in the same queue. The lots in queue 204 are ranked from top to bottom as follows: $3^{rd}, 4^{th}, 5^{th}, 2^{nd}$, and $1^{st}$. The lots in queue 208 are ranked from top to bottom as follows: $1^{st}$ and $2^{nd}$.

Referring now to FIG. 3a, an alternative embodiment of the invention is shown. A manufacturing line 300 is shown. Tools 302, 304, 306 and 308 are shown as rectangular cubes on the manufacturing line. The bottlenecks 310 and 312 are shown as larger cubes on the manufacturing line. Those skilled in the art will recognize that manufacturing lines may have more or less tools and bottlenecks, and that this invention is equally applicable to manufacturing processes with multiple manufacturing lines.

Still referring to FIG. 3a, each tool 302, 304, 306, 308 and bottleneck 310, 312 location may be referred to as a "station" 320, 322, 326, 328, 330, 332. Associated with each station 320, 322, 326, 328, 330 and 332 are lots 314. Each tool 302, 304, 306, 308 and bottleneck 310, 312 may have a display 316 located at their respective stations 320, 322, 326, 328, 330, 332. Each display 316 may be communicably coupled via a coupling 317 to a lot scheduling processor ("LSP") 318. The LSP 318 may be any sort of CPU, computer system, or machine able to perform the calculations described in this specification. The displays 316 may be coupled directly to the LSP 318, or may be coupled through an intranet, internet, or any other communications network. Thus, data may be inputted into the LSP 318, and the LSP 318 may then perform calculations in order to determine the rankings for each lot in a queue at a station. The ranking may be displayed on the displays 316, so that an operator is informed as to which lot to select from the queue for further processing in the manufacturing process. In another embodiment, the operator may be a robotic operator, and the LSP 318 may be communicably coupled to the robotic operator, and then the robotic operator selects the proper lot from the queue based on the ranking communicated to it from the LSP 318.

Referring now to FIG. 3b, one detailed embodiment of an LSP 318 is shown. The communications coupling is shown as 317. Five inputs are shown for the LSP 318: (1) the goal weighing factor ("G"); (2) an input for the time needed at bottleneck-buffer; (3) an input for the PCT to next bottleneck for each lot; (4) the time until due for each lot and (5) the estimated time to EOL for each lot. Once the LSP 318 has received the inputs, the LSP 318 can calculate the BNFF, CR and the rank according to the equations shown inside the LSP 318 on FIG. 3b. Once the rank for each lot is calculated, the LSP may transmit the rank information through the coupling 317.

This invention need be applied at every tool, but may be applied only at complex tools and bottlenecks. That is, only complex tools and bottlenecks would be associated with a station, thus reducing the complexity of the invention, by reducing the number of stations. Complex tools may be those tools selected as such because those tools have a certain minimum number of lots that must be processed through them, those tools that require an automated manager, or those tools that have different types of lots (product mix) going through them. Complex tools may be selected for other non-listed reasons.

Figure 4:
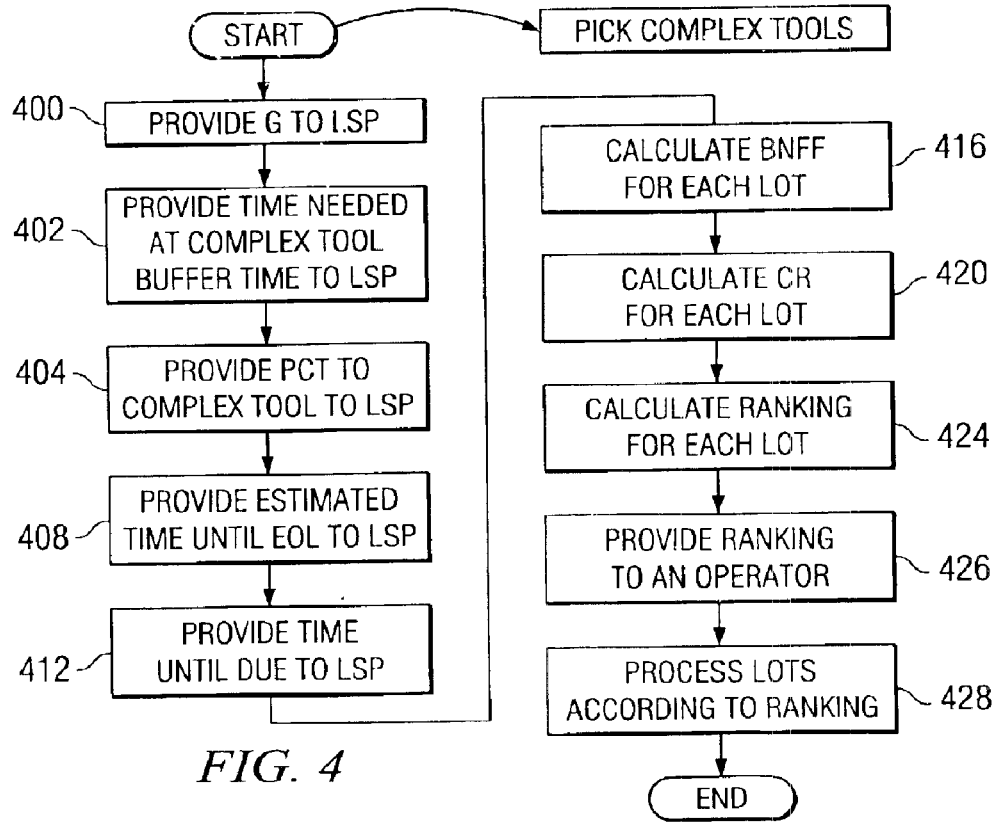
FIG. 4 is a process flow diagram illustrating the method of scheduling lots according to one embodiment of the invention.

Referring now to FIG. 4, a flow chart illustrating a method for scheduling the manufacturing of lots according to the present invention is shown, but with stations only at the bottlenecks and at complex tools. At step 400 certain tools are selected as complex tools. At step 401, the G is provided to the LSP. At step 402, the time needed at bottleneck-buffer time is provided to the LSP. At step 404 the PCT to next Bottleneck for each lot is provided to the LSP 318 (from FIGS. 3a and 3b). At step 408 the estimated time until EOL for each lot is provided to the LSP 318. At step 412 the time until due for each lot is provided to the LSP 318. Those skilled in the art will recognize that steps 400, 402, 404, 408 and 412 may be accomplished in numerous ways including using a menu driven program, manually inserting values for certain variables directly into a program code, and remotely sending the data to the LSP. At step 416 the LSP calculates the BNFF for each lot. At step 420 the LSP calculates the CR for each lot. At step 424 the LSP calculates the ranking for each lot. In step 426 the lot rankings are provided to an operator. The operator may be human or robotic. The means of providing the lot ranking to the operator may be via a display located at the tool station, or may be directly communicated to a robotic operator, or may be communicated to an operator via an ear piece or portable data devise such as a PDA. Finally at step 428, the lots are processed according the ranking calculated by the LSP. Those skilled in the art will recognize that this embodiment may be applicable to more tools up to all the tools in a manufacturing line, depending on how one selects the complex tools.

Figure 5:
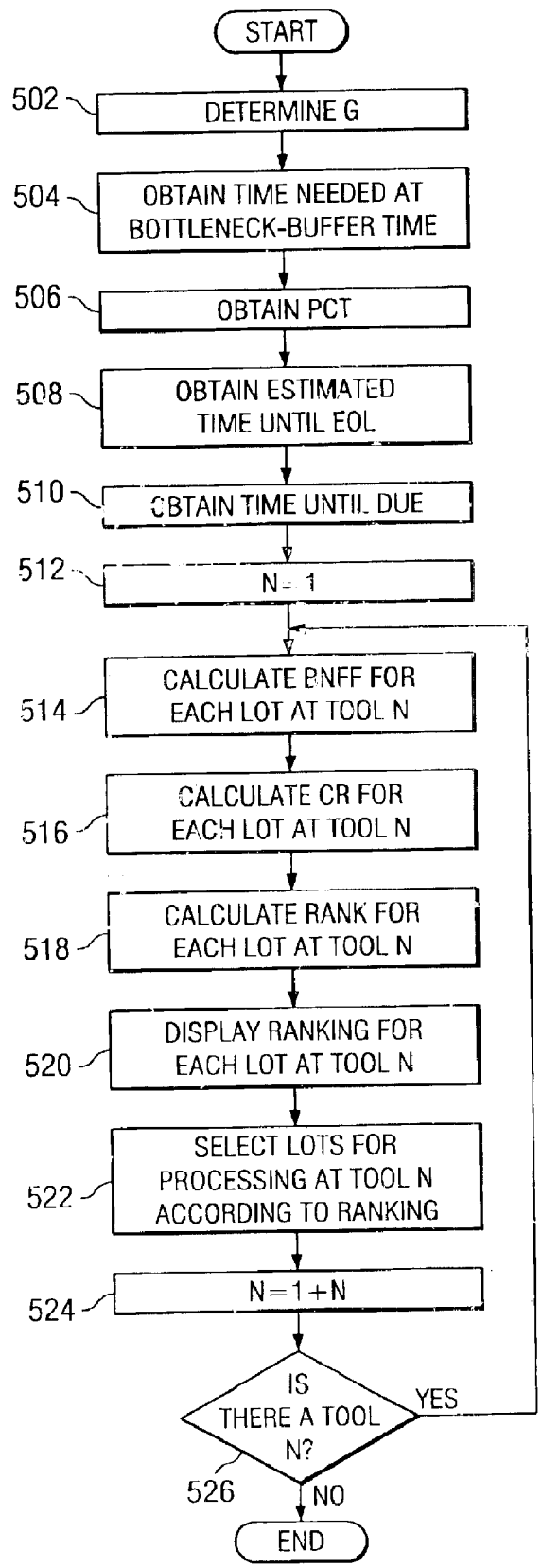
FIG. 5 is a process flow diagram of a method of scheduling lots according to a further embodiment of the invention.

Referring now to FIG. 5, a flow chart depicting another method for scheduling the manufacturing of lots according to the present invention is shown. In this embodiment, each tool has a station associated with it, not just complex tools and bottlenecks. However, other embodiments may have fewer tools associated with stations. At step 502, a goal weighing factor is determined. At step 504 the method obtains the time needed at bottleneck-buffer time. At step 506 the method obtains the PCT to next bottleneck for each lot. At step 508 the method obtains the estimated time until EOL for each lot. At step 510 the method obtains the time until due for each lot. Those skilled in the art will recognize that steps 504, 506, 508 and 510 may be accomplished in numerous ways including inputting data using a menu driven program, manually inserting values for certain variables directly into a program code, and remotely sending the data to the LSP 318 (from FIGS. 3a and 3b). At step 512 a counter N is set to 1. At step 514 the BNFF is calculated for lot at the Nth tool. At step 516, the CR is calculated for each lot at the Nth tool. At step 518 the rank for each lot at the Nth tool is calculated. At step 520 the ranking for each lot at the Nth tool is displayed. At step 522 the lots are selected for processing at the Nth tool according to the ranking. At step 524 the counter N is advanced by 1. At query 526, it is determined whether there is an Nth tool. If there is an Nth tool, the method goes back to step 514. If there is not an Nth tool, the method ends.

The embodiments and examples set forth herein are presented in order to best explain the present invention and its practical application and to thereby enable those skilled in the art to make and utilize the invention.

Those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A system for scheduling lots of items for manufacturing comprising:
    a manufacturing line, with a plurality of stations for processing lots to be manufactured;
    a tool at said stations for processing said lots; and
    a lot scheduling processor communicably coupled to said stations and able to compute bottleneck feed factors and critical ratios for each lot based on time needed at bottleneck minus buffer time, planned cycle time for each lot, estimated time until end of the line for each lot, and time until due for each lot.

2. The system of claim 1, further comprising a plurality of displays located at said stations and communicably coupled to said lot scheduling processor.

3. The system of claim 1, wherein the bottleneck feed factor for a particular lot is calculated by subtracting the ratio of the time needed at bottleneck minus buffer time all over the planned cycle time for said particular lot from one.

4. The system of claim 1, wherein the critical ratio for a particular lot is calculated by dividing the time until due for said particular lot by the estimated time to the end of the line for said particular lot.

5. The system of claim 1, wherein said lot scheduling processor calculates a ranking for each lot by applying a goal weighing factor to said bottleneck feed factor and by applying the compliment of said goal weighing factor to said critical ratio.

6. The system of claim 1, wherein a plurality of lots are arranged in at least one queue and wherein said queue is located at at least one station.

7. The system of claim 6, wherein an operator selects a lot to be processed from said queue based on the computations of the lot scheduling processor.

8. The system of claim 6, wherein a robotic operator selects a lot to be processed from said at least one queue based on the computations of the lot scheduling processor.

9. In a manufacturing line with a plurality of stations and a tool at said stations for processing lots of items to be manufactured and a lot scheduling processor communicably coupled to said stations, a method for scheduling the processing of lots for manufacturing comprising the steps of:
    providing, to said lot scheduling processor, the time needed at bottleneck minus buffer time;
    providing, to said lot scheduling processor, the planned cycle time for each lot;
    providing, to said lot scheduling processor, the estimated time until end of the line for each lot;
    providing, to said lot scheduling processor, the time until due for each lot,
    by said lot scheduling processor, calculating the bottleneck feed factor for each lot;
    by said lot scheduling processor, calculating the critical ratio for each lot; by said lot scheduling processor, calculating a ranking of said lots based upon said bottleneck feed factors and critical ratios, and
    processing said lots in order according to said ranking.

10. The method of claim 9 further comprising the step of providing, to said lot scheduling processor, a goal weighing factor.

11. The method of claim 10, wherein the step of calculating a ranking of lots comprises the step of adding the product of said bottleneck feed factor times a goal weighing factor and the product of said critical ratio times the compliment of said goal weighing factor.

12. The method of claim 9 further comprising the step of displaying the rankings of each lot at a display device located at said stations.

13. The method of claim 9 wherein the step of calculating a bottleneck feed factor for each lot comprises the steps of:
    calculating, by said lot scheduling processor, the ratio of the time needed at bottleneck minus buffer all over the planned cycle time for said particular lot, and
    subtracting, by said lot scheduling processor, the said ratio of the time needed at bottleneck minus buffer all over the planned cycle lime from one.

14. The method of claim 9 wherein the step of calculating the critical ratio for each lot comprises the steps of:
    calculating, by said lot scheduling processor, the ratio of the time until due for said particular lot over the estimated time to the end of the line for said particular lot, and subtracting, by said lot scheduling processor, the said ratio of the time until due for said particular lot over the estimated time to the end of the line for said particular lot from one.

15. The method of claim 9 further comprising the step of providing said ranking to an operator.

16. A method for scheduling lots for semiconductor manufacturing comprising the steps of:
   determining a goal weighing factor;
   calculating the bottleneck feed factor for each lot in a tool queue;
   calculating the critical ratio for said each lot in a tool queue;
   calculating the relative rank of each lot in a tool queue;
   displaying the relative rank of each lot in a tool queue, for each tool queue; and
   selecting the lots in each tool queue for tooling according to said relative rank.

17. The method of claim 16, wherein the displaying step comprises the step of sending the relative rank of each lot in a tool queue, to a display associated with said tool queue's respective tool.

18. The method of claim 16, wherein the displaying step comprises:
   providing the relative rank of each lot in a tool queue to) a computer network.

19. A method for scheduling lots for semiconductor manufacturing, comprising:
   determining a goal weighing factor,
   obtaining the time needed at bottleneck minus buffer;
   obtaining the planned cycle time for each lot;
   obtaining the estimated time until the end of the line for each lot;
   obtaining the time until due for each lot;
   calculating the bottleneck feed factor for each lot in a tool queue;
   calculating the critical ratio for said each lot in a tool queue;
   calculating the relative rank of each lot in a tool queue; and
   selecting the lots In each tool queue for tooling according to said relative rank.

20. A program storage device readable by a machine, tangibly embodying a program of instructions executable by the machine to perform a method for scheduling lots for semiconductor manufacturing, the method comprising the steps of:
   receiving the time needed at bottleneck minus buffer time;
   receiving the planned cycle time for each lot;
   receiving the estimated time until end of the line for each lot;
   receiving the time until due for each lot;
   calculating the bottleneck feed factor for each lot, calculating the critical ratio for each lot; and
   calculating a ranking of lots based upon said bottleneck feed factors and critical ratios.

21. The program storage device readable by a machine, tangibly embodying a program of instructions executable by the machine to perform a method for scheduling lots for semiconductor manufacturing, the method of claim 20 further comprising the step of:
   receiving a goal weighing factor.

22. The program storage device readable by a machine, tangibly embodying a program of instructions executable by the machine to perform a method for scheduling lots for semiconductor manufacturing, the method of claim 20, wherein the step of calculating a ranking of lots comprises the step of adding the product of said bottleneck feed factor times a goal weighing factor and the product of said critical ratio times the complement of said goal weighing factor.

23. The program storage device readable by a machine, tangibly embodying a program of instructions executable by the machine to perform a method for scheduling lots for semiconductor manufacturing, the method of claim 20 further comprising a step of displaying the rankings of each lot at a display device located at said stations.

24. The program storage device readable by a machine, tangibly embodying a program of instructions executable by the machine to perform a method for scheduling lots for semiconductor manufacturing, the method of claim 20 wherein the step of calculating a bottleneck feed factor for each lot comprises the steps of:
   calculating the ratio of the time needed at bottleneck minus buffer time all over the planned cycle time for said particular lot; and
   subtracting the said ratio from one.

25. The program storage device readable by a machine, tangibly embodying a program of instructions executable by the machine to perform a method for scheduling lots for semiconductor manufacturing, the method of claim 20 wherein the step of calculating the critical ratio for each lot comprises the following step:
   calculating the ratio of the time until due for said particular lot over the estimated time to the end of the line for said particular lot.

26. The program storage device readable by a machine, tangibly embodying a program of instructions executable by the machine to perform a method for scheduling lots for semiconductor manufacturing, the method of claim 20 further comprising the step of providing said ranking to an operator.

* * * * *